United States Patent
Bui et al.

(10) Patent No.: US 9,685,180 B2
(45) Date of Patent: *Jun. 20, 2017

(54) COARSE ACTUATOR POSITIONING ALGORITHM

(71) Applicant: International Business Machines Corporation, Armonk, NY (US)

(72) Inventors: Nhan X. Bui, Tucson, AZ (US); Angeliki Pantazi, Thalwil (CH); Tomoko Taketomi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,094

(22) Filed: Mar. 10, 2016

(65) Prior Publication Data

US 2016/0196845 A1    Jul. 7, 2016

Related U.S. Application Data

(63) Continuation of application No. 14/637,317, filed on Mar. 3, 2015, now Pat. No. 9,299,373, which is a
(Continued)

(51) Int. Cl.
*G11B 5/584* (2006.01)
*G11B 15/18* (2006.01)
(Continued)

(52) U.S. Cl.
CPC .......... *G11B 5/584* (2013.01); *G11B 5/00817* (2013.01); *G11B 5/56* (2013.01); *G11B 15/1883* (2013.01); *G11B 15/602* (2013.01)

(58) Field of Classification Search
None
See application file for complete search history.

(56) References Cited

U.S. PATENT DOCUMENTS 5,343,341 A    8/1994    Jahren
5,379,165 A    1/1995    Pahr
(Continued)

FOREIGN PATENT DOCUMENTS

JP    2003085720 A    3/2003

OTHER PUBLICATIONS

Statement of Relevance of Non-Translated Foreign Document JP2003085720.
(Continued)

*Primary Examiner* — K. Wong
(74) *Attorney, Agent, or Firm* — Zilka-Kotab, P. C.

(57) ABSTRACT

A computer program product for positioning an actuator, according to one embodiment, includes a computer readable storage medium having program instructions embodied therewith. The computer readable storage medium is not a transitory signal per se. The program instructions are executable by a processing circuit to cause the processing circuit to perform a method that includes generating or receiving, by the processing circuit, a first value representative of a lateral position of a tape, and using, by the processing circuit, the first value to adjust a position of a coarse actuator for moving a magnetic head in response to determining that the first value is in a first range relative to a first threshold. An integrator value is used by the processing circuit to adjust the position of the coarse actuator in response to determining that the first value is in a second range relative to the first threshold.

8 Claims, 13 Drawing Sheets

Related U.S. Application Data continuation of application No. 14/157,078, filed on Jan. 16, 2014, now Pat. No. 9,013,827.

(51) Int. Cl.
*G11B 5/56* (2006.01)
*G11B 15/60* (2006.01)
*G11B 5/008* (2006.01)

(56) References Cited

U.S. PATENT DOCUMENTS

| | | | |
|---|---|---|---|
| 6,963,467 | B2 | 11/2005 | Bui et al. |
| 8,027,121 | B2 | 9/2011 | Argumedo et al. |
| 8,059,362 | B2 | 11/2011 | Hancock et al. |
| 8,526,134 | B2 | 9/2013 | Bui et al. |
| 9,013,827 | B1 | 4/2015 | Bui et al. |
| 9,047,897 | B1 | 6/2015 | Bui et al. |
| 9,299,373 | B2 | 3/2016 | Bui et al. |
| 2003/0016467 | A1 | 1/2003 | Bui et al. |
| 2007/0230033 | A1 | 10/2007 | McAllister et al. |
| 2009/0201604 | A1 | 8/2009 | Harper |
| 2011/0102937 | A1 | 5/2011 | Argumedo et al. |
| 2015/0199986 | A1 | 7/2015 | Bui et al. |

OTHER PUBLICATIONS

Non-Final Office Action from U.S. Appl. No. 14/157,078, dated Jul. 31, 2014.
Notice of Allowance from U.S. Appl. No. 14/157,078, dated Dec. 5, 2014.
Non-Final Office Action from U.S. Appl. No. 14/157,101, dated Jun. 30, 2014.
Final Office Action from U.S. Appl. No. 14/157,101, dated Nov. 19, 2014.
Alfano et al., "New technique for monitoring lateral tape motion using a magnetic signal," Microsystem Technologies, Springer-Verlag, vol. 12, Jan. 17, 2006, pp. 565-570.
Gentilini et al., "Lateral Tape Motion Control With Robust Performance Evaluation Based on RBode Plot," IEEE Transactions on Industrial Electronics, vol. 59, No. 10, Oct. 2012, pp. 3971-3978.
Petrek, D. J., "New Delay-Integration Method for Measurement of Lateral Tape Motion and Study of Tape Performance Under High Speed Conditions," Master's Thesis for the Ohio State University, Nov. 2007, pp. 1-86.
Petrek et al., "Study of magnitude and component frequency variation of lateral tape motion across an unsupported tape region," Microsystem Technologies, Springer-Verlag, vol. 14, Oct. 18, 2007, pp. 427-438.
Bui et al., U.S. Appl. No. 14/157,078, filed Jan. 16, 2014.
Bui et al., U.S. Appl. No. 14/157,101, filed Jan. 16, 2014.
Notice of Allowance from U.S. Appl. No. 14/157,101, dated Jan. 29, 2015.
Supplemental Notice of Allowability from U.S. Appl. No. 14/157,101, dated Apr. 23, 2015.
Final Office Action from U.S. Appl. No. 14/637,317, dated Sep. 14, 2015.
Non-Final Office Action from U.S. Appl. No. 14/637,317, dated May 20, 2015.
Bui et al., U.S. Appl. No. 14/637,317, filed Mar. 3, 2015.
Notice of Allowance from U.S. Appl. No. 14/637,317, dated Dec. 9, 2015.

COARSE ACTUATOR POSITIONING ALGORITHM

BACKGROUND

The present invention relates to data storage systems, and more particularly, this invention relates to positioning a coarse actuator based on the lateral position of a magnetic medium.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A computer program product for positioning an actuator, according to one embodiment, includes a computer readable storage medium having program instructions embodied therewith. The computer readable storage medium is not a transitory signal per se. The program instructions are executable by a processing circuit to cause the processing circuit to perform a method that includes generating or receiving, by the processing circuit, a first value representative of a lateral position of a tape, and using, by the processing circuit, the first value to adjust a position of a coarse actuator for moving a magnetic head in response to determining that the first value is in a first range relative to a first threshold. An integrator value is used by the processing circuit to adjust the position of the coarse actuator in response to determining that the first value is in a second range relative to the first threshold.

Various embodiments may be implemented in a magnetic data storage system such as a tape drive system, which may include a magnetic head, a drive mechanism for passing a magnetic medium (e.g., recording tape) over the magnetic head, and a processing circuit (e.g., controller) electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems for positioning a coarse actuator, as well as operation and/or component parts thereof. Various embodiments described herein include positioning a coarse actuator based, at least in part on lateral motion of a magnetic tape. Moreover, it should be noted that positioning a coarse actuator as used herein also refers to the position of a magnetic head corresponding to the coarse actuator, as will be described in further detail below.

In one general embodiment, a method includes receiving a value (IntegRevAve) representative of a lateral position of a tape, comparing the value to a first threshold, using the value to adjust a position of a coarse actuator when the value is in a first range relative to the first threshold, and selectively using an integrator center value (IntegCtr) to adjust the position of the coarse actuator when the value is in a second range relative to the first threshold.

Figure 1A:
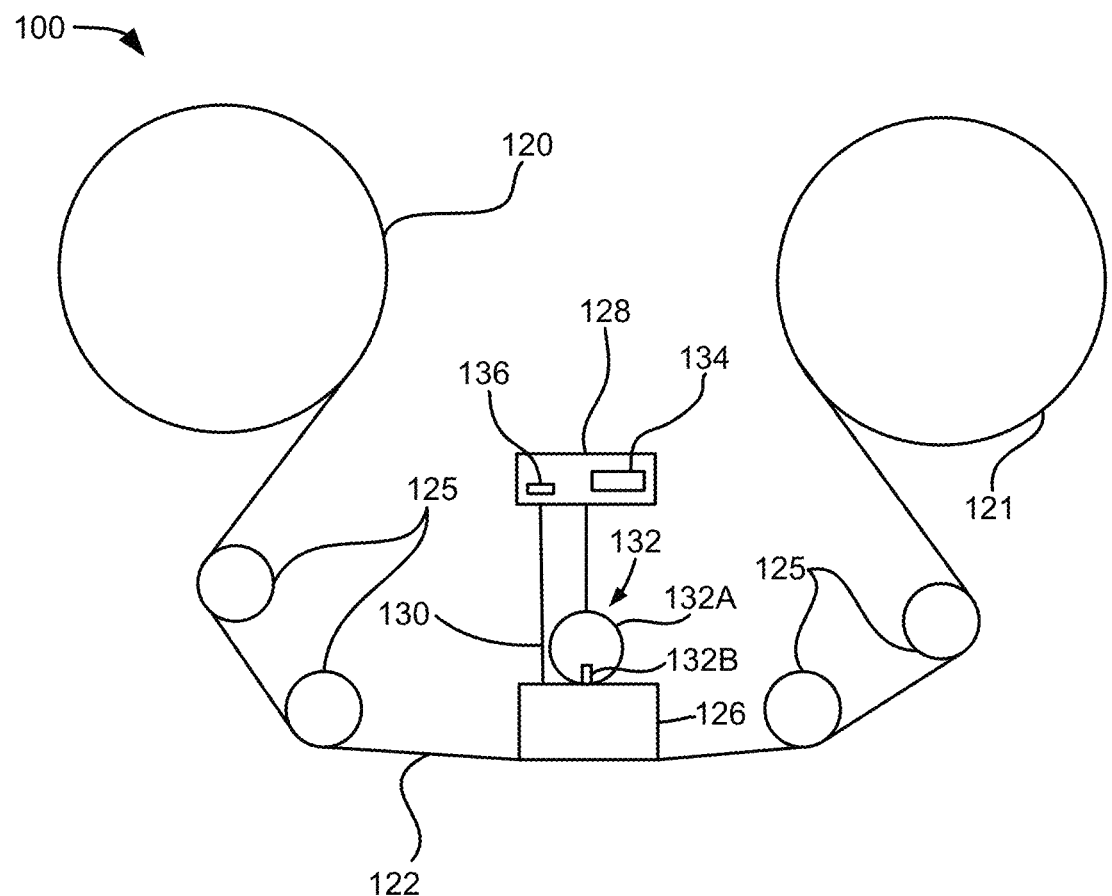
FIG. 1A is a schematic diagram of a simplified tape drive system according to one embodiment.

FIG. 1A illustrates a simplified tape drive system 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

However, as the tape 122 is unwound from a supply reel (e.g., tape supply cartridge 120), lateral motion of the tape across the magnetic tape head 126 can generally be caused by a reel runout effect and/or flange shifts. The reel runout effect results from wobbles of the rotational motion of a motor used to unwind the tape 122 from a supply reel 120. Thus, the reel runout effect repeats with each rotation of the supply reel 120, and appears sinusoidal in nature, as will be discussed in further detail below.

Moreover, flange shifts occur when a tape 122 shifts from being positioned against one of the supply reel's flanges to the other flange while being unwound threrefrom and passed across a magnetic tape head 126. This generally occurs because the distance separating the flanges of the supply reel is larger than the width of the tape in the crosstrack direction and/or the flanges themselves are tapered. Thus, as the tape 122 is wound onto the supply reel, the tape 122 is generally pressed against one of the two flanges and may shift from being positioned against one flange to the other flange multiple times throughout the length of the tape. As a result, when the tape 122 is unwound, the shifts between flanges create large lateral shifts of the tape's position relative to the magnetic tape head 126.

Therefore, the tape drive system 100 preferably includes a mechanism (not shown) for generating a signal representative of the lateral position of the magnetic head 126 with respect to the tape 122, e.g., an LTM signal. According to various approaches, the mechanism may include an electronic computing device, a signal generator, an arbitrary waveform generator, a digital pattern generator, a frequency generator, etc. Moreover, the LTM signal may be used for positioning the tape head 126 such that a target track of the tape is about directly below the tape head 126, e.g., for reading therefrom and/or writing thereto, as will be described in further detail below.

Guides 125 guide the tape 122 across the tape head 126. Such tape head 126 is in turn coupled to a controller 128 via a cable 130. The controller 128 may be or include a processor and/or any logic for controlling any subsystem of the drive 100. For example, the controller 128 typically controls head functions such as servo following, data writing, data reading, etc.

With continued reference to FIG. 1A, the controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof. According to one embodiment, the controller 128 may perform one or more operations for receiving and/or processing an LTM signal, as will be discussed in further detail below.

The cable 130 may include read/write circuits to transmit data to the head 126 to be recorded on the tape 122 and to receive data read by the head 126 from the tape 122. An actuator 132 controls position of the head 126 relative to the tape 122, and may be of conventional design. The actuator 132 includes a coarse actuator 132A and a fine actuator 132B. The coarse actuator 132A is configured to position the fine actuator 132B and head 126 towards a target track on the medium. The fine actuator 132B is then used for fine track following during operation. Thus, as alluded to above, according to various embodiments described herein, the position of the coarse actuator and/or positioning the coarse actuator also refers to the position of the magnetic head and/or positioning the magnetic head.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
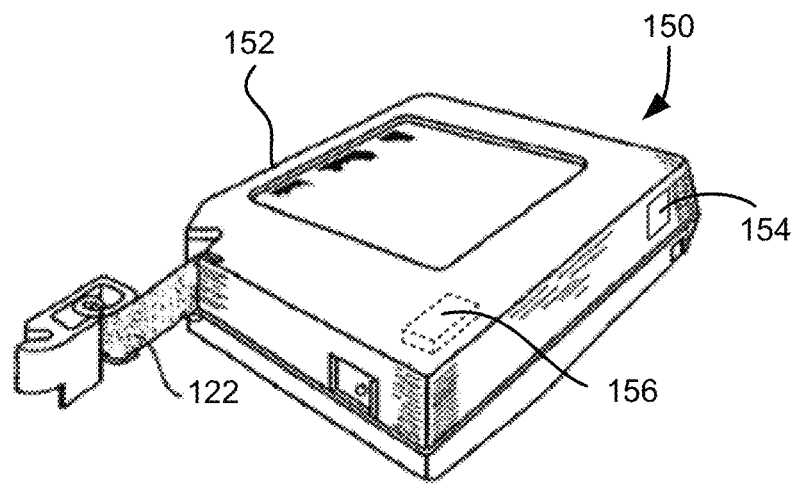
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
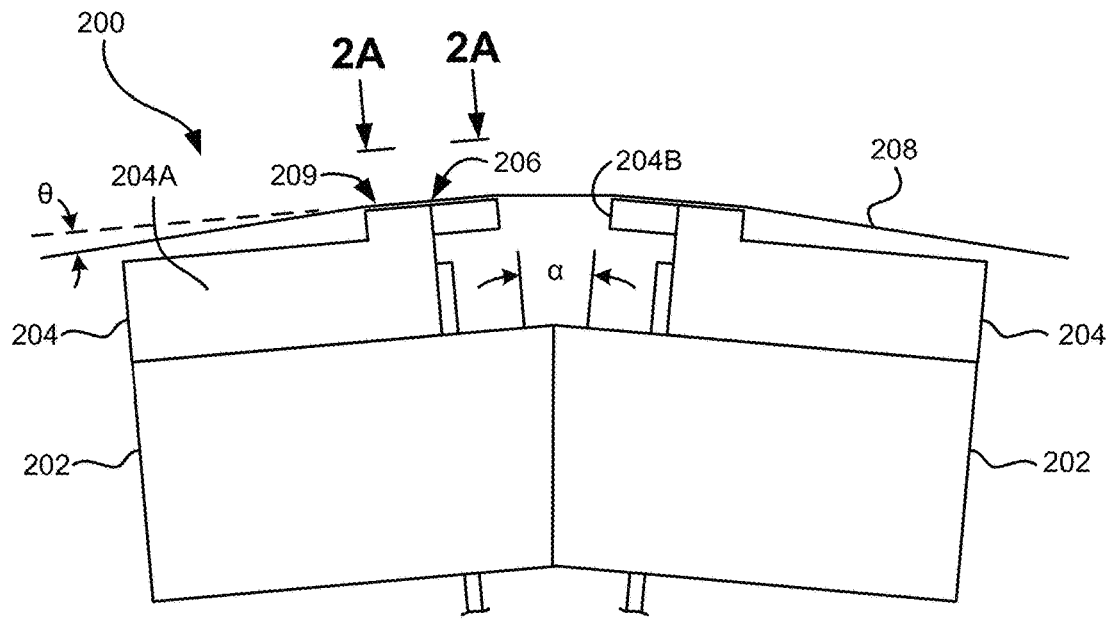
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
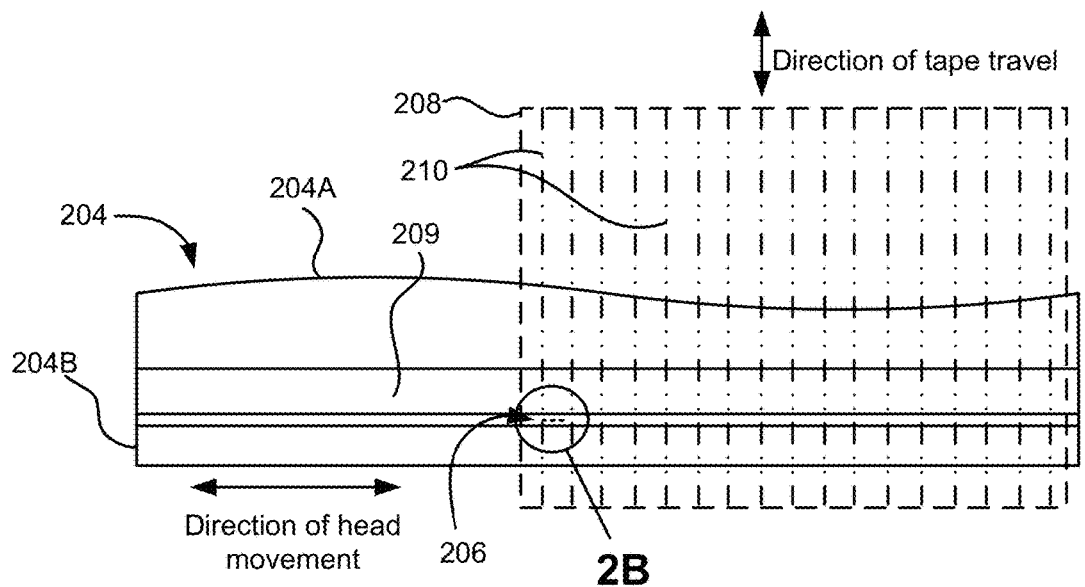
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
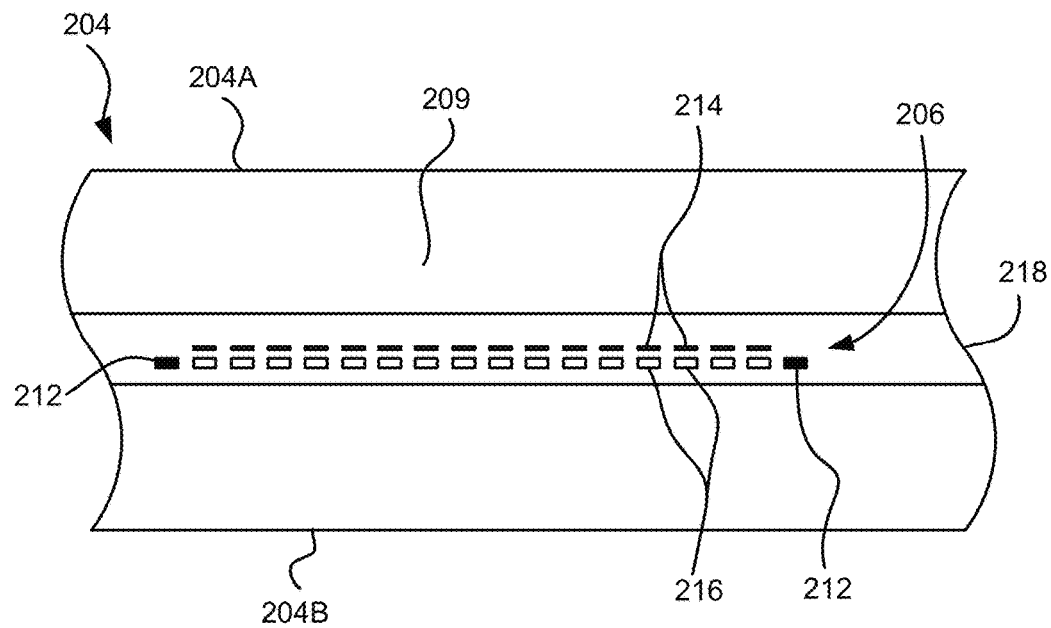
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
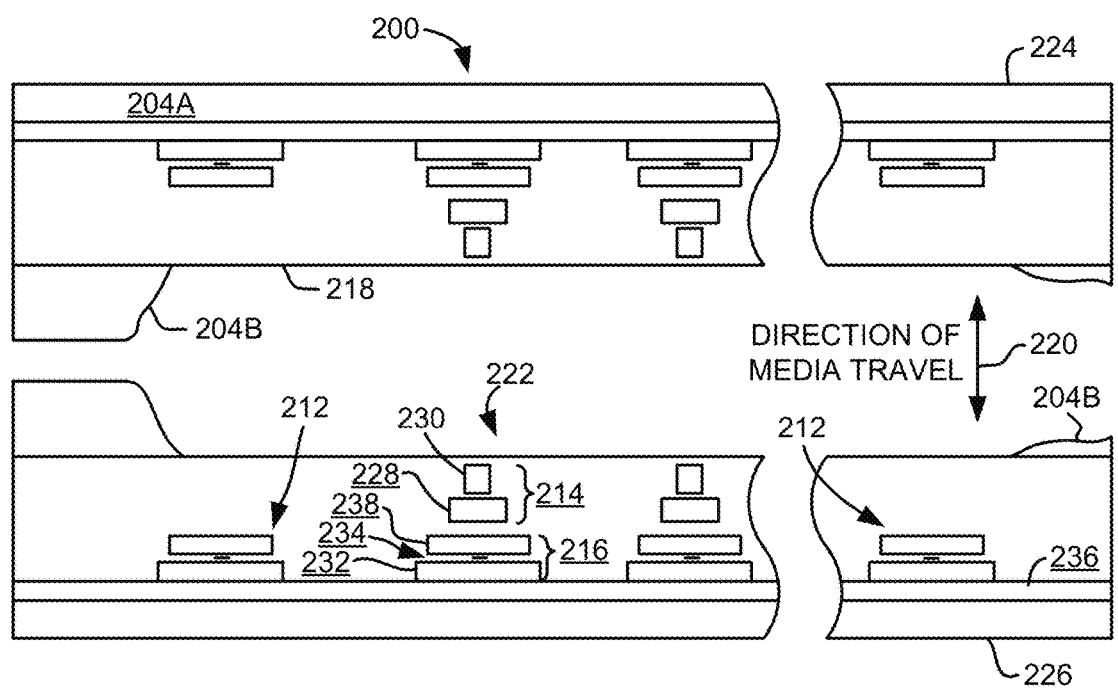
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
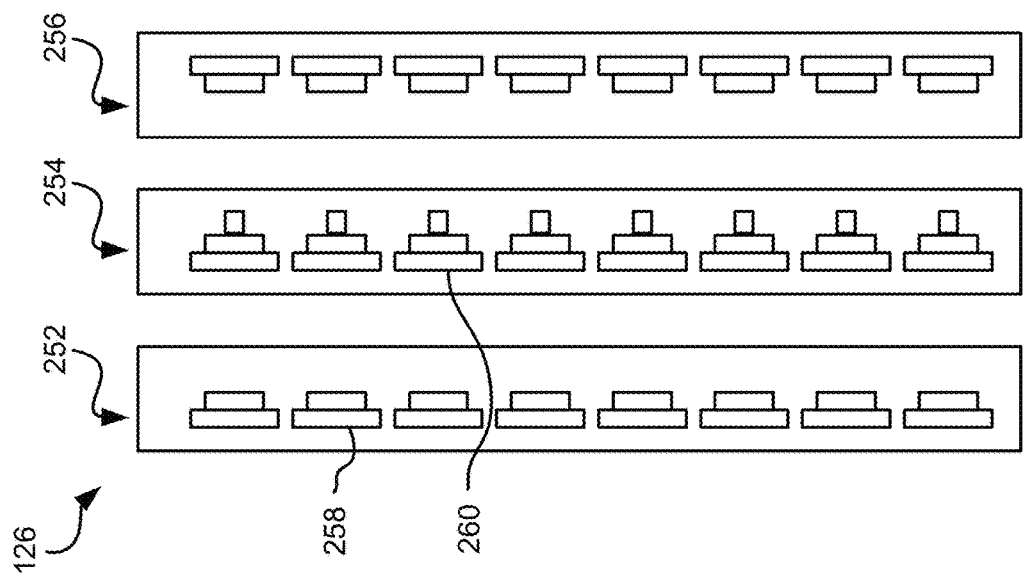
FIG. 4 is a partial tape bearing surface view of a magnetic head having a read-write-read configuration.
Figure 3:
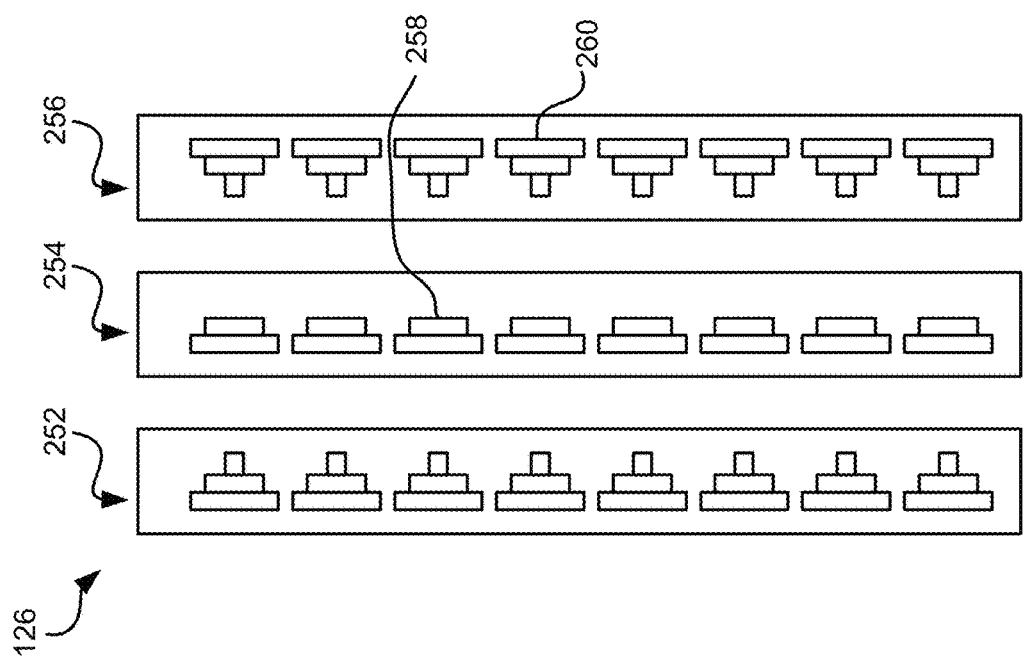
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
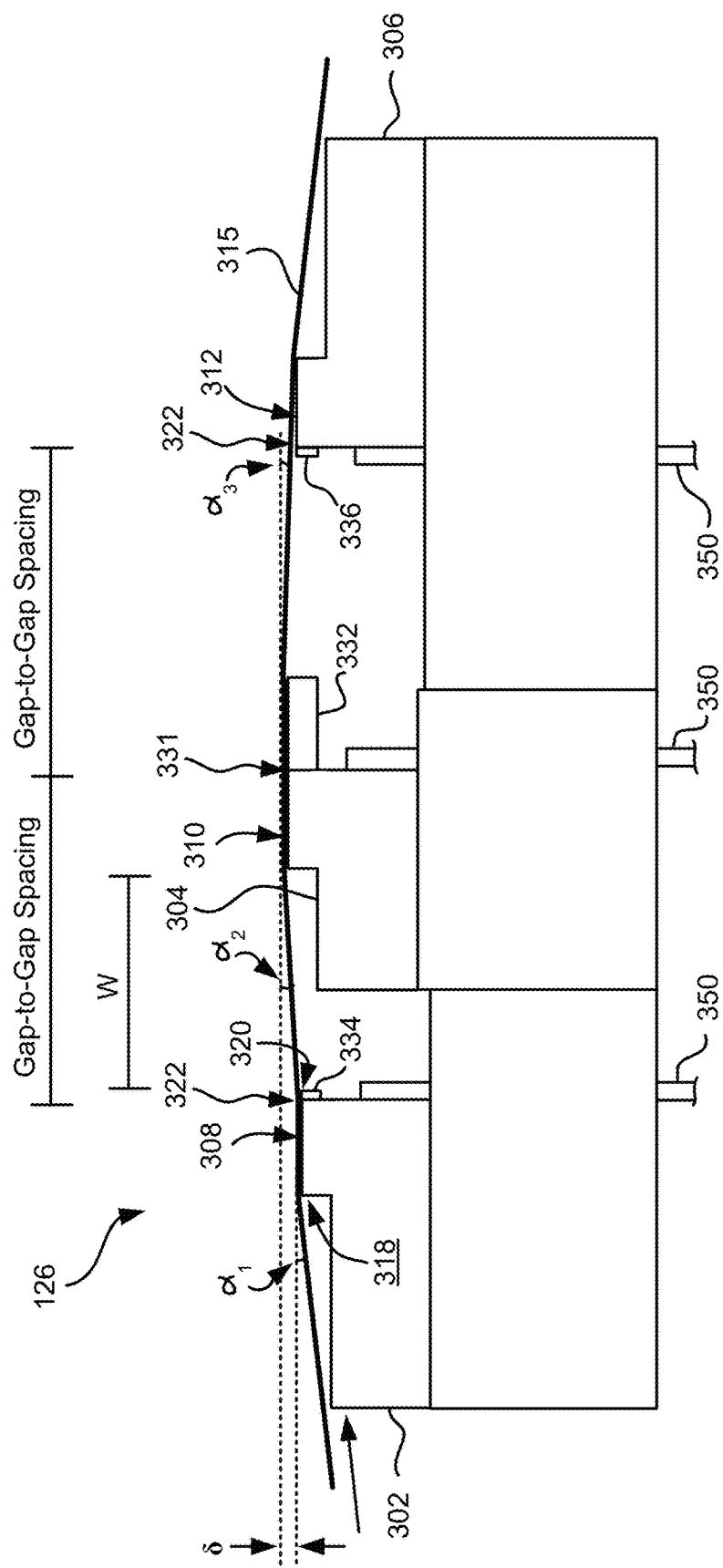
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
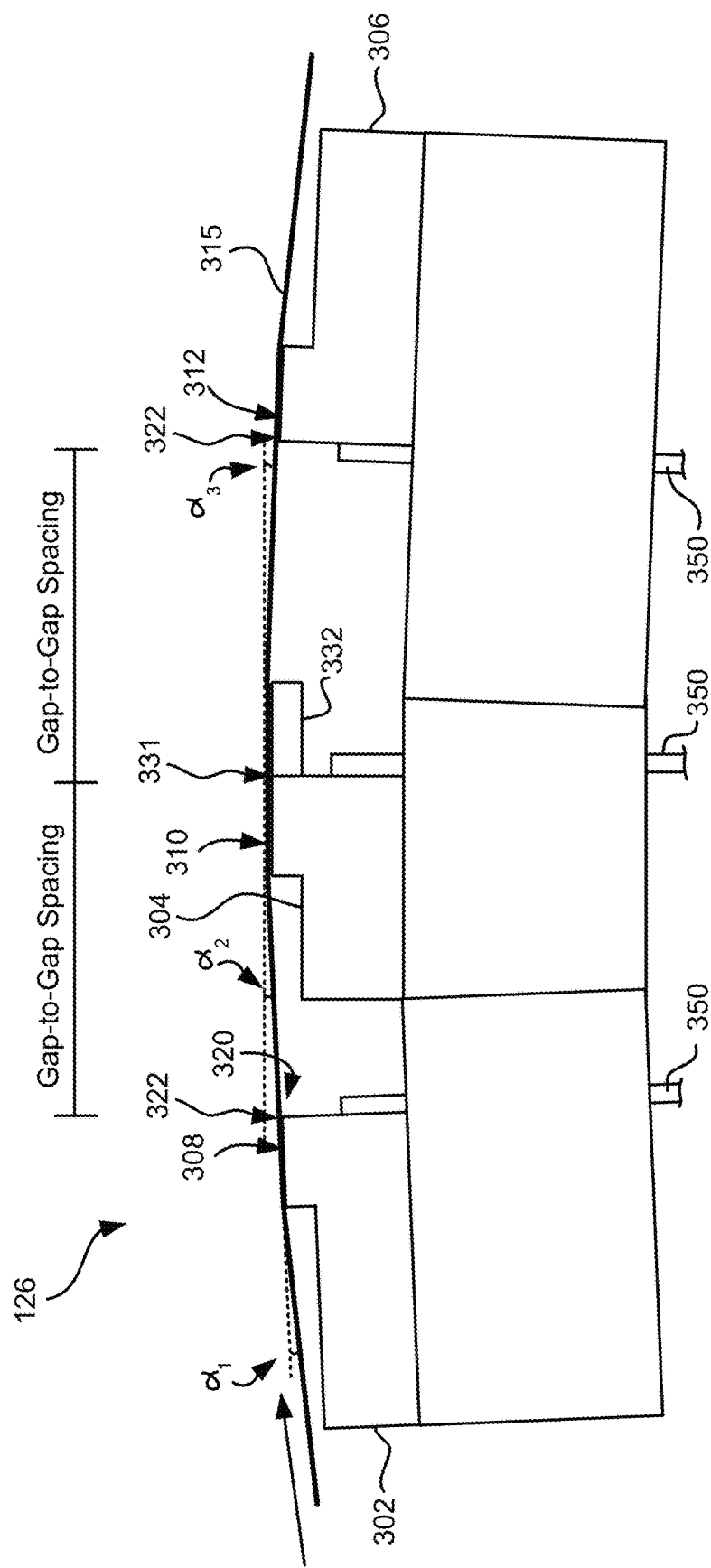
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
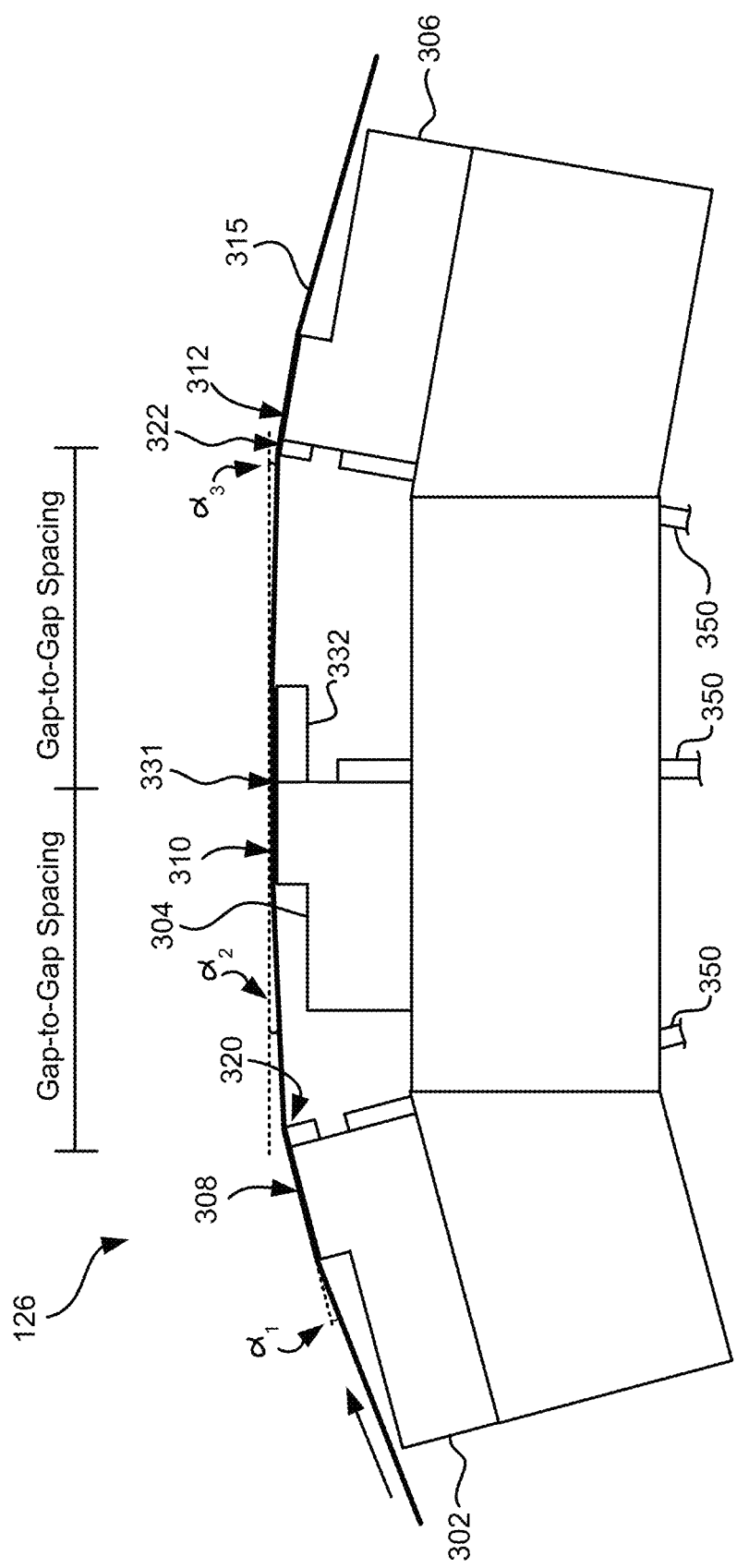
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As tape drive storage capacity continues to improve, corresponding track densities rapidly increase. This results in a wide variety of LTM phenomena for different tapes and/or cartridges. For example, looking to FIG. 8A, the graph 800 illustrates one phenomenon in which a tape remains laterally shifted from a magnetic head in one direction, e.g., resulting from a flange shift as described above. The x-axis represents a number of cycles corresponding to sampling intervals used to collect the data presented in the graph 800. The sampling intervals may be translated into units of time by multiplying by 50 microseconds (μsec). For example, the sampling interval $1\times10^4$, corresponds to $(50 \; \mu sec) \times (1\times10^4) = 0.5$ seconds.

Figure 8A:
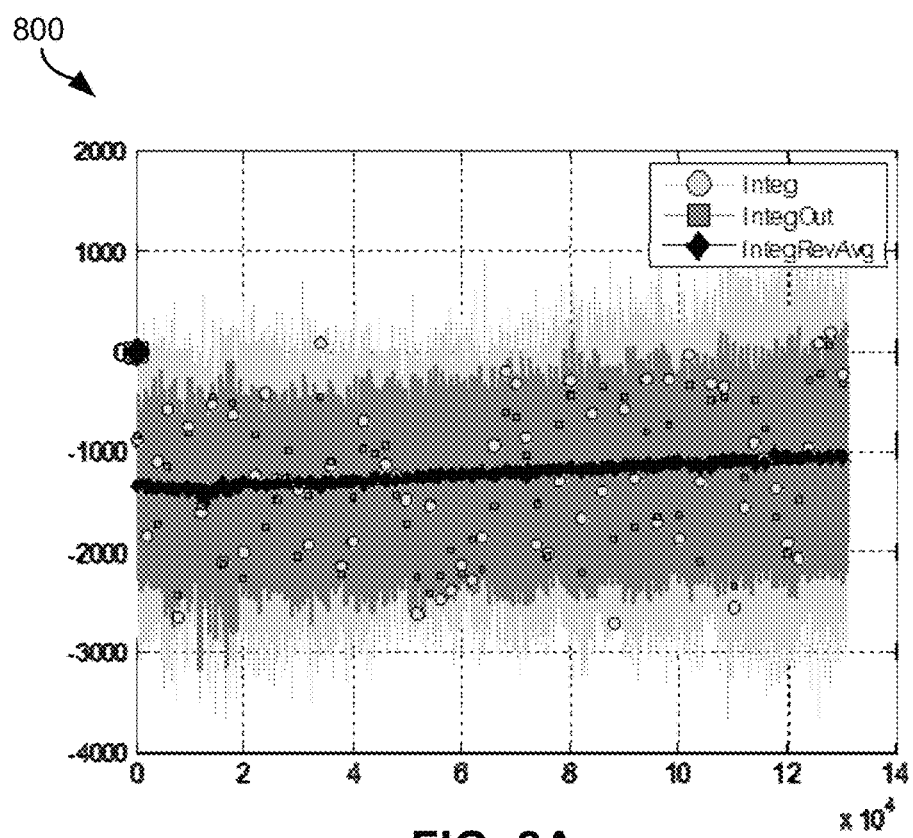
FIGS. 8A-8C are graphs illustrating Lateral Tape Motion (LTM) phenomena for tapes and/or cartridges according to different embodiments.
Figure 8B:
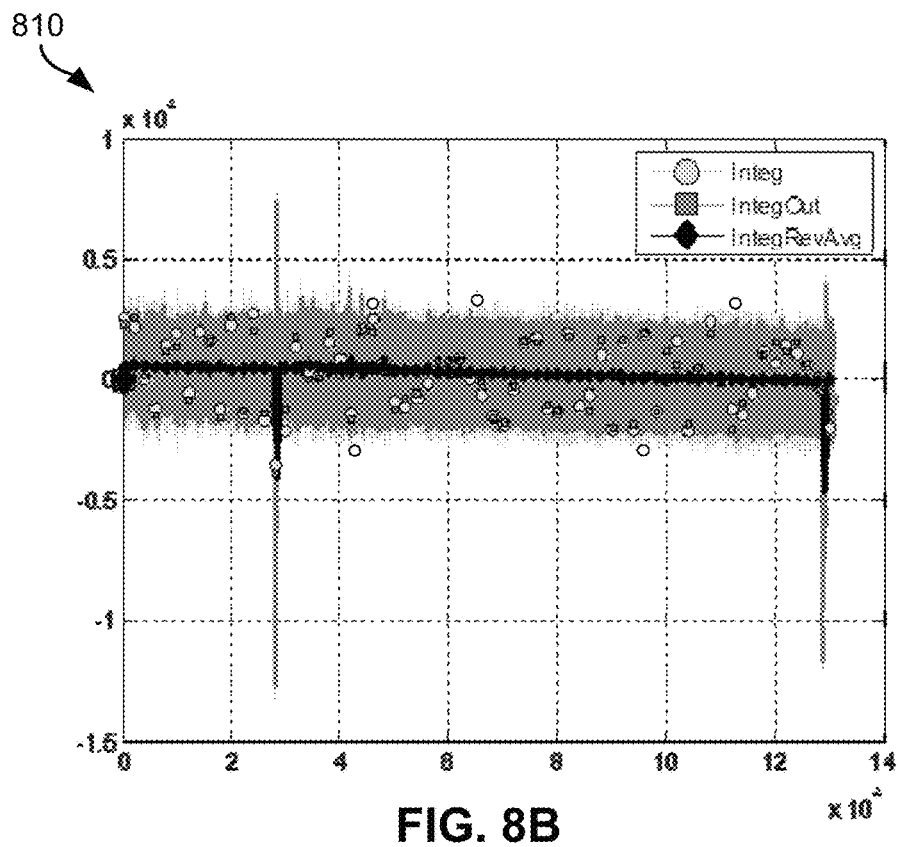

According to another example, the graph 810 of FIG. 8B illustrates another phenomenon in which short stack shifts up and/or down produce LTM spikes, which may be used to determine whether the tape is stacked against the upper or lower flange of a tape reel as described above. Further still, some tapes and/or cartridges have spans of upper level LTM in addition to lower level LTM. Looking to the graph 820 of FIG. 8C, some tapes and/or cartridges have combinations of upper and lower level LTM, e.g., with fluctuating periods and/or amplitudes.

It follows that precise track following servo systems are preferably paired with increased track densities to minimize runtime errors. As described above, some embodiments incorporate a combination of coarse and/or fine actuators for track following with a magnetic head during operation (e.g., see 132A, 132B of FIG. 1A respectively). Preferably, track following is able to determine the position of the tape from an LTM signal, and use a coarse actuator to position the magnetic head at about the center of a target track despite potential lateral offset of the tape. Illustrative embodiments including lateral tape motion signal conditioning for coarse servo positioning are presented in coassigned U.S. patent application Ser. No. 14/157,101 to Nhan Bui et al., filed Jan. 16, 2014 and titled LATERAL TAPE MOTION SIGNAL CONDITIONING, and which is herein incorporated by reference.

Thus, by using a coarse actuator to position the magnetic head at about the center of a target track, the short stroke and high bandwidth of the fine actuator may follow the lateral transitions of the tape during runtime, without the risk of running out of stroke. Various embodiments described herein include apparatuses and/or methods for positioning a coarse actuator based at least in part on lateral motion of a magnetic tape, as will soon become apparent.

Figure 9:
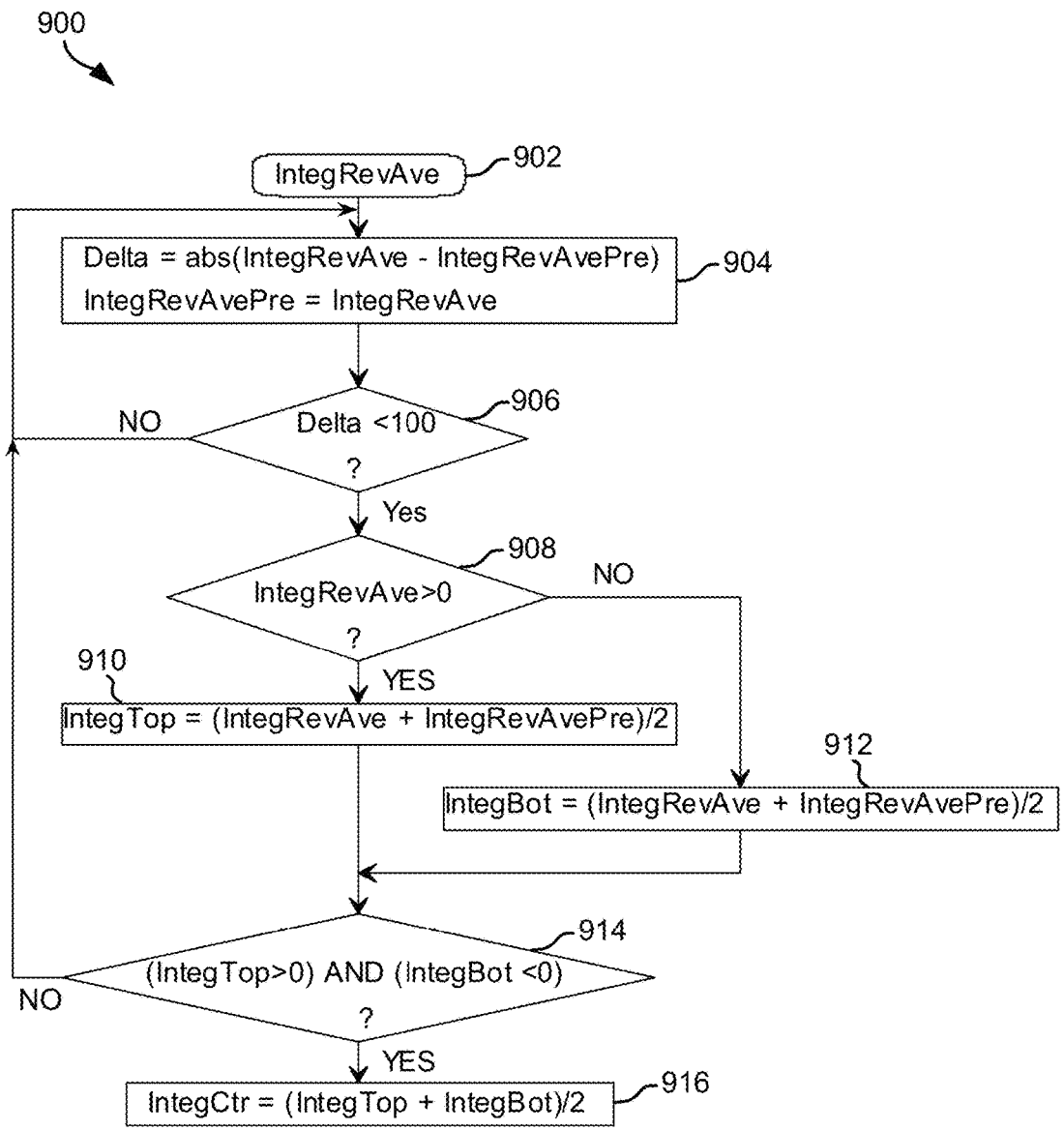
FIG. 9 is a flowchart of a method, according to one embodiment.

FIG. 9 depicts a flowchart of a method 900 for determining an integrator center value IntegCtr, in accordance with one embodiment. As an option, the present method 900 may be implemented in conjunction with features from any other embodiment listed herein, such as those described with reference to the other FIGS. In one approach, which is in no way intended to limit the invention, a controller may be used to perform one or more process steps of the flowchart depicted in FIG. 9. Moreover, according to an exemplary embodiment, one or more of the process steps of method 900 may be performed by the controller 128 of FIG. 1A.

Of course, however, such method 900 and others presented herein may be used in various applications and/or in permutations which may or may not be specifically described in the illustrative embodiments listed herein. Further, the method 900 presented herein may be used in any desired environment. Thus FIG. 9 (and the other FIGS.) should be deemed to include any and all possible permutations.

Looking now to FIG. 9, operation 902 of method 900 includes calculating and/or receiving a value IntegRevAve representative of a lateral position of a tape, e.g., at a target track thereon, relative to a magnetic head (e.g., see 122, 126 of FIG. 1A respectively). The value IntegRevAve preferably corresponds to lateral tape motion (e.g., flange shifts and/or reel runout) of a tape towards the top or bottom flange of a supply reel while being unwound from the supply reel (e.g., see 121 or 120 of FIG. 1A depending on the direction of tape travel). Thus, according to a preferred approach, IntegRevAve is updated after each full rotation of a supply reel. However according to other approaches, IntegRevAve may be updated after more than one full revolution of a supply reel, e.g., after two full rotations of a supply reel. Thus, according to an exemplary embodiment which is in no way intended to limit the invention, if a tape supply reel has 24 portions corresponding to each full revolution thereof, IntegRevAve is preferably updated after 24 portions have passed, thereby corresponding to a full revolution of the supply reel.

According to different embodiments, the value IntegRevAve may be calculated based on a signal, e.g., from a driver circuit of a fine actuator, integrator signal from a fine actuator compensator, a tape edge detector that optically and/or physically detects LTM, etc. Illustrative embodiments for calculating the value IntegRevAve are presented in U.S. patent application Ser. No. 14/157,101 titled LATERAL TAPE MOTION SIGNAL CONDITIONING, which has been incorporated by reference above.

Furthermore, operation 904 of method 900 includes calculating Delta, which is equal to the absolute value of the difference between IntegRevAve and IntegRevAvePre. IntegRevAvePre corresponds to a previous value of IntegRevAve, and is updated during operation 904 to the value IntegRevAve received in operation 902 e.g., to be used in calculating the next Delta value. In one approach, IntegRevAvePre may be stored in memory (e.g., a lookup table) until the next time operation 904 is reached by method 900.

According to an example, which is in no way intended to limit the invention, a value IntegRevAve of 200 may be received in operation 902. Moreover, IntegRevAvePre may have a stored value of 250, e.g., from the last value IntegRevAve. Thus, still referring to the present example, Delta would be calculated as the absolute value of 200-250, which results in a value of 50. Furthermore, the value of IntegRevAvePre is updated to 200 (the current value of IntegRevAve) and stored in memory for future use.

Referring again to FIG. 9, decision 906 of method 900 includes comparing the value of Delta to 100. If Delta is greater than or equal to some value, 100 in this example, method 900 returns to operation 902, e.g., until another value IntegRevAve is received. However, if Delta is less than 100, method 900 proceeds to decision 908.

According to different embodiments, Delta may be compared to a value different than 100, e.g., depending on user preference, sensitivity of the data, a system's margin for error, etc. Moreover, it should be noted that in various embodiments described herein, if a decision is made depending on a value being below a given threshold, the same determination may be made equivalently if the value is above the threshold with signs reversed. For example, which is in no way intended to limit the invention, 3>1 may produce the same determination as −3<−1.

Referring still to method 900 of FIG. 9, in decision 908, IntegRevAve is compared to zero. If IntegCtr is greater than zero, method 900 moves to operation 910 where IntegTop is calculated as: IntegTop=(IntegRevAve+IntegRevAvePre)/2. See operation 910. IntegTop corresponds to the tape being positioned towards a first flange of a supply reel.

However, if IntegCtr is less than zero, method 900 moves to operation 912 where IntegBot is calculated as: IntegBot= (IntegRevAve+IntegRevAvePre)/2. See operation 912. IntegBot corresponds to the tape being positioned towards a second flange of a supply reel opposite the first flange. IntegTop and/or IntegBot may further be stored in memory, e.g., for future use, depending on the desired embodiment.

With continued reference to FIG. 9, method 900 proceeds to decision 914 where IntegTop and IntegBot are compared to zero. If it is determined that IntegTop is not greater than zero and/or IntegBot is not less than zero, then method 900 returns to operation 902, e.g., until another value IntegRevAve is received. However, if it is determined that IntegTop is greater than zero and that IntegBot is less than zero, method 900 proceeds to operation 916 where IntegCtr is calculated as: IntegCtr=(IntegTop+IntegBot)/2.

The integrator center value IntegCtr represents the running (e.g., updated) sample mean of the data (e.g., signal) corresponding to IntegRevAve. According to an exemplary embodiment, the integrator center value IntegCtr may assist in positioning a coarse actuator to compensate for lateral motion of a magnetic tape, as will soon become apparent. Moreover, it should be noted that "data" as used herein may include digital and/or analog data, which may be represented by a signal, a value or values, etc. Therefore, although in some embodiments data may be presented as a graph, in other embodiments data may correspond to digital and/or analog data stored in a lookup table, presented to a user, etc.

Figure 10:
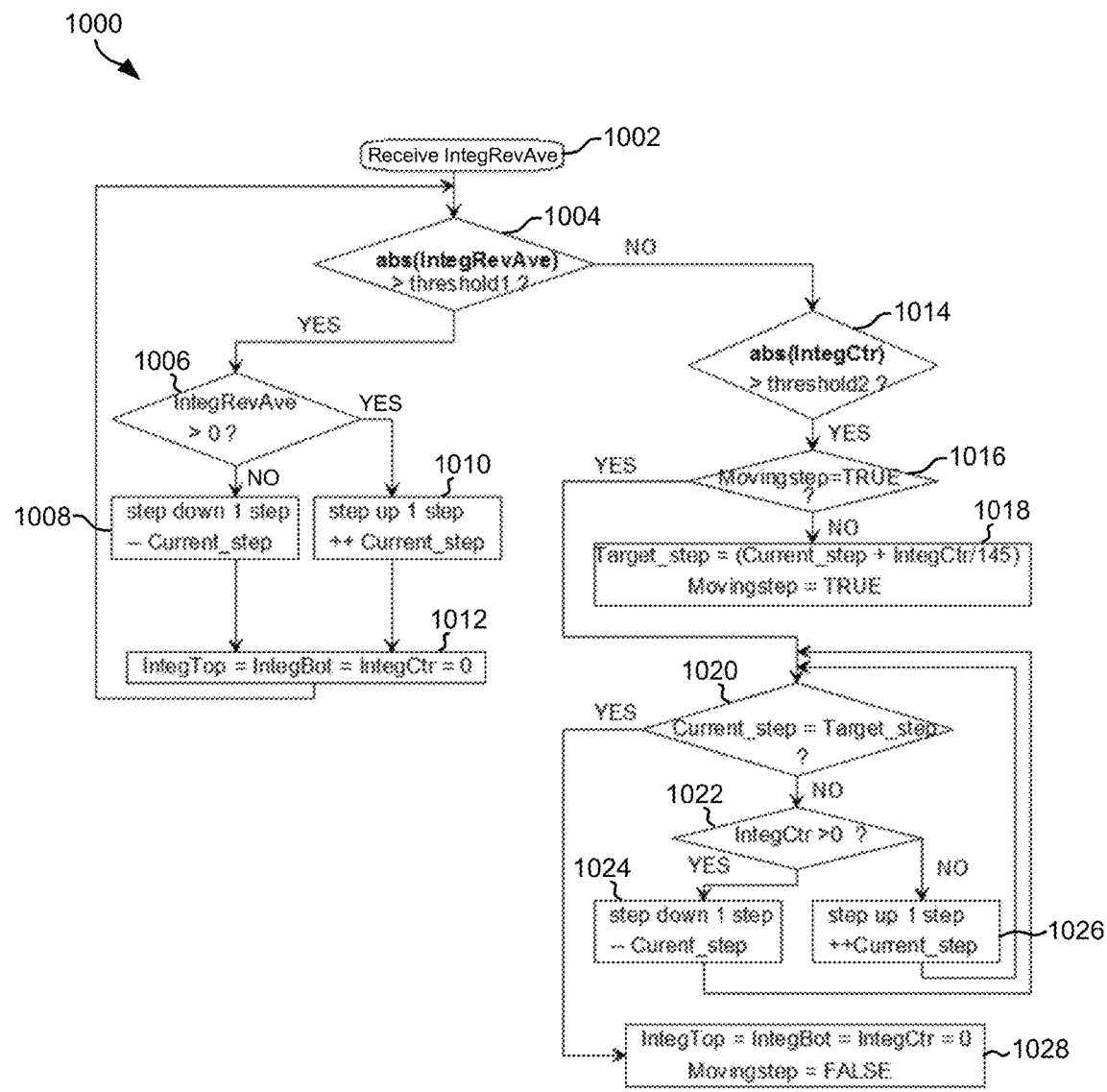
FIG. 10 is a flowchart of a method, according to one embodiment.

FIG. 10 depicts a flowchart of a method 1000 for positioning a coarse actuator in accordance with one embodiment. As an option, the present method 1000 may be implemented in conjunction with features from any other embodiment listed herein, such as those described with reference to the other FIGS. In one approach, which is in no way intended to limit the invention, a controller may be used to perform one or more process steps of the flowchart depicted in FIG. 10. Moreover, according to an exemplary embodiment, one or more of the process steps of method 1000 may be performed by the controller 128 of FIG. 1A.

Looking now to FIG. 10, operation 1002 of method 1000 includes receiving a value IntegRevAve representative of a lateral position of a tape (e.g., at a target track thereon) relative to a magnetic head (e.g., see 122, 126 of FIG. 1A respectively). The value IntegRevAve preferably corresponds to lateral tape motion (e.g., flange shifts and/or reel runout) of a tape being unwound from the supply reel. According to different embodiments, the value may be calculated based on a signal, e.g., from a driver circuit of a fine actuator, integrator signal from a fine actuator compensator, a tape edge detector that optically and/or physically detects LTM, etc.

Furthermore, the method 1000 includes comparing an absolute value of the value IntegRevAve to a first threshold threshold1, as illustrated in decision 1004. Decision 1004 determines if the lateral position of a tape relative to a magnetic head is within a first threshold threshold1 to direct the flowchart of method 1000 through one of the two feedback control paths illustrated.

Referring still to decision 1004, if the absolute value of IntegRevAve is in a first range relative to the first threshold threshold1 (i.e., the absolute value of IntegRevAve is larger than threshold1), the method 1000 includes using the value IntegRevAve to adjust a position of a coarse actuator. Moreover, when the absolute value of IntegRevAve is in a second range relative to the first threshold threshold1 (i.e., the absolute value of IntegRevAve is smaller than threshold1), the method 1000 includes selectively using an integrator center value IntegCtr to adjust the position of the coarse actuator, as will be described in further detail below. Referring to the present description, "selectively using" is intended to mean that in some approaches, a further decision is performed to determine whether to adjust the coarse actuator. However, in other approaches, "selectively using" may be intended to mean that the coarse actuator is always adjusted.

As mentioned immediately above, when the absolute value of IntegRevAve is larger than the first threshold threshold1, the method 1000 includes using the value IntegRevAve to adjust a position of a coarse actuator. According to a specific embodiment, decision 1006 of the method 1000 includes comparing the value IntegRevAve to some value, in this example, zero.

If IntegRevAve is greater than zero, the current position of the magnetic head Current_step is decremented 1 step. See operation 1008. However, if IntegRevAve is less than zero, the current position of the magnetic head Current_step is incremented 1 step. See operation 1010.

By decrementing or incrementing the current position of the magnetic head as seen in operations 1008, 1010 respectively, the magnetic head is preferably moved in the same direction as the lateral tape motion. Thus, the magnetic head may be repositioned such that the distance separating the current position of the magnetic head and an average position of a target track on the laterally shifted tape (e.g., represented by the updated value of IntegRevAve) is less than the first threshold threshold1.

Depending on the desired embodiment, the first threshold threshold1 may include any predetermined value. According to an exemplary approach, the first threshold threshold1 is 3000, but may be higher or lower in other embodiments. Moreover, in various approaches, the threshold1 may change before, after, and/or during an operation, e.g., depending on operation conditions; user preferences; read and/or write characteristics, e.g., data sensitivity, operation type, etc.; etc.

Furthermore, the size of the step by which the current position of the magnetic head Current_step is incremented and decremented may include any predetermined value. However, in some approaches the size of the step may be determined by a device used to position the magnetic head in relation to the tape. According to one example, a stepper motor may be used to position the magnetic head. Thus, depending on the size, functionality, design, etc. of the stepper motor, each position, selectable by stepping, may correspond to a different value. It should be noted that for purposes of the present embodiment illustrated in the method 1000 of FIG. 10, the operations correspond to a stepper motor which changes the position of the magnetic head by 145 counts for each step. For example, if it is determined in decision 1006 that the value of IntegRevAve is greater than zero, the current position of the coarse actuator Current_step is incremented 145 counts. Moreover, other embodiments described herein may include a coarse actuator that changes the position of the magnetic head by 145 counts for each step.

With continued reference to FIG. 10, the method 1000 further includes setting IntegTop, IntegBot and IntegCtr to zero. See operation 1012. Moreover, after operation 1012 has been performed, the method 1000 revisits operation 1002, where an updated value IntegRevAve is received and recompared to the first threshold threshold1 in decision 1004.

As mentioned above, if it is determined in decision 1004 that the absolute value of the value IntegRevAve is not greater than the first threshold threshold1, the method 1000 includes selectively using an integrator center value IntegCtr to adjust the position of the coarse actuator. As described above, the integrator center value IntegCtr represents the running (e.g., updated) sample mean of the signal corresponding to the value IntegRevAve, and may be calculated using method 900 of FIG. 9.

Looking to decision 1014 of FIG. 10, the absolute value of the integrator center value IntegCtr is compared to a second threshold threshold2. If the absolute value of the integrator center value IntegCtr is smaller than the second threshold threshold2, the lateral position of the tape relative to the magnetic head is within an overall desired limit. According to one approach, the flowchart of method 1000 may return to operation 1002, e.g., until another value IntegRevAve is received. Moreover, in other approaches, if the absolute value of the integrator center value IntegCtr is smaller than the second threshold threshold2, a data entry may be made to a lookup table, a signal may be sent to a system administrator, etc., e.g., by a controller that may be facilitating one or more operations of method 1000.

However, if the absolute value of the integrator center value IntegCtr is greater than the second threshold threshold2, the method 1000 proceeds to decision 1016. Decision 1016 determines whether a variable Movingstep is set to true TRUE, e.g., a value corresponding to a condition. If Movingstep is not set to true TRUE, method 1000 moves to operation 1018 where a target step Target_step is calculated.

As shown in operation 1018, the target step Target_step value is equal to the current position of the coarse actuator Current_step added to IntegCtr/145. As described above, the operations in this example correspond to a stepper motor which changes the position of the magnetic head by 145 counts for each step, but may be adapted and executed in similar fashion to embodiments using any number of counts per step. Thus, in the present example, IntegCtr/145 represents the number of steps it would take the coarse actuator to substantially align the magnetic head with a given target track. However, in other embodiments, each step performed by the coarse actuator may correspond to a different number of counts. Thus, in such other embodiments, the target step may be calculated by incorporating the number of counts corresponding to each step of the coarse actuator. For example, if a stepper motor changes the position of the magnetic head by 100 counts for each step, Target_step would be equal to Current_step added to IntegCtr/100.

With continued reference to operation 1018, once the target step Target_step is calculated, Movingstep is set to true TRUE, whereby method 1000 proceeds to decision 1020. Decision 1020 determines whether the current position of the coarse actuator Current_step is equal to the target step Target_step. If Current_step is equal to the target step Target_step, the current position of the coarse actuator is at the target location. Thus, according to one approach, the flowchart of method 1000 may return to operation 1002, e.g., until another value IntegRevAve is received.

However, if decision 1020 determines that Current_step is not equal to the target step Target_step, the method proceeds to decision 1022 where the integrator center value IntegCtr is compared to zero. If IntegCtr is greater than zero, the current position of the magnetic head Current_step is decremented 1 step. See operation 1024. However, if IntegCtr is less than zero, the current position of the magnetic head Current_step is incremented 1 step. See operation 1026.

By decrementing or incrementing the current position of the magnetic head as seen in operations 1024, 1026 respectively, the magnetic head is preferably moved towards the target step. Moreover, method 1000 returns to decision 1020 where the current position of the coarse actuator Current_step is again compared to the target step Target_step. If Current_step is still not equal to Target_step, method 1000 proceeds to decision 1022 as described above. However, if Current_step is equal to Target_step, method 1000 moves to operation 1028 where IntegTop, IntegBot and IntegCtr are set to zero, and the flowchart is reset, e.g., returns to operation 1002.

Figure 11A:
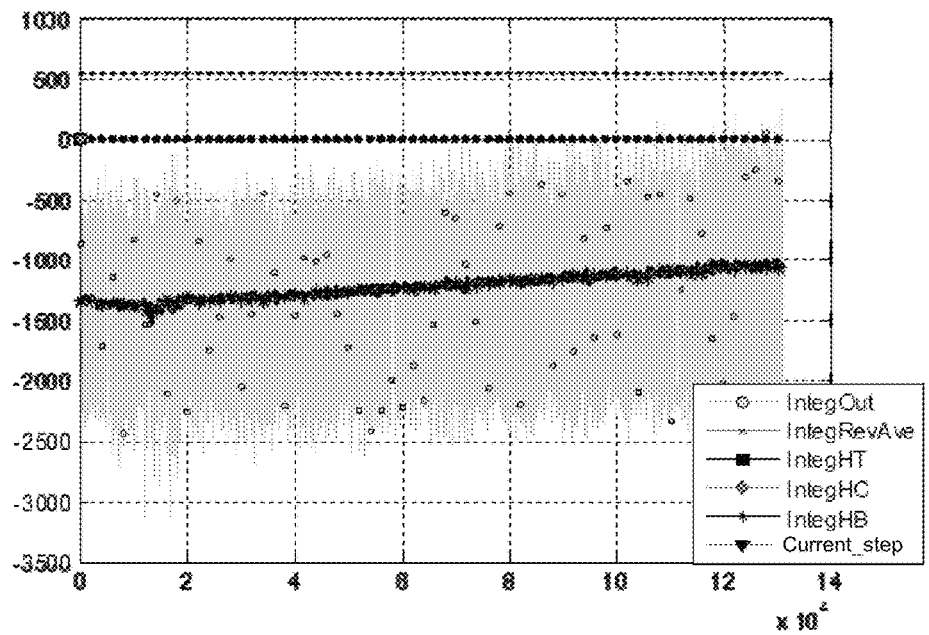
FIGS. 11A-11C are graphs illustrating the position of a magnetic head relative to the LTM phenomena of FIGS. 8A-8C.
Figure 11B:
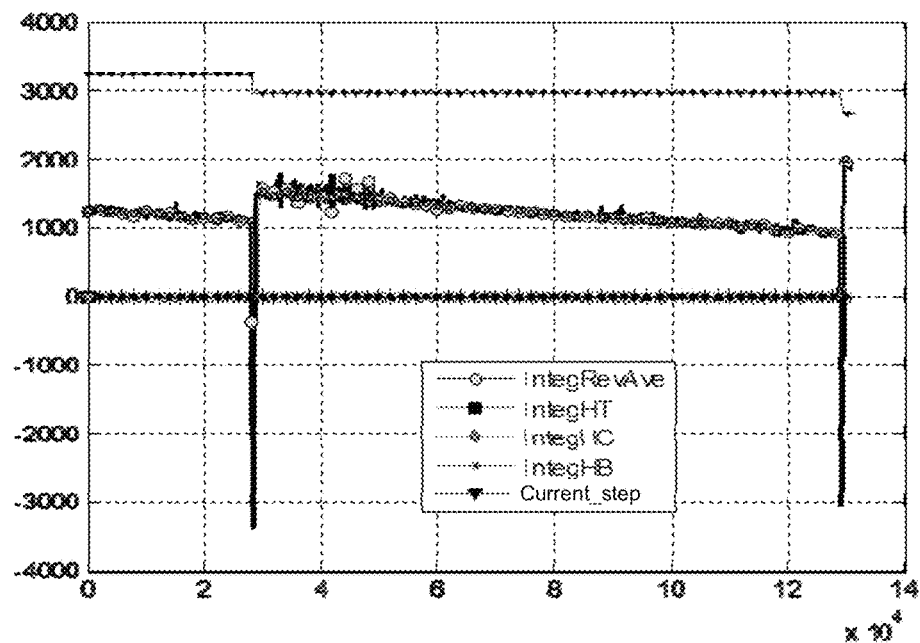
Figure 11C:
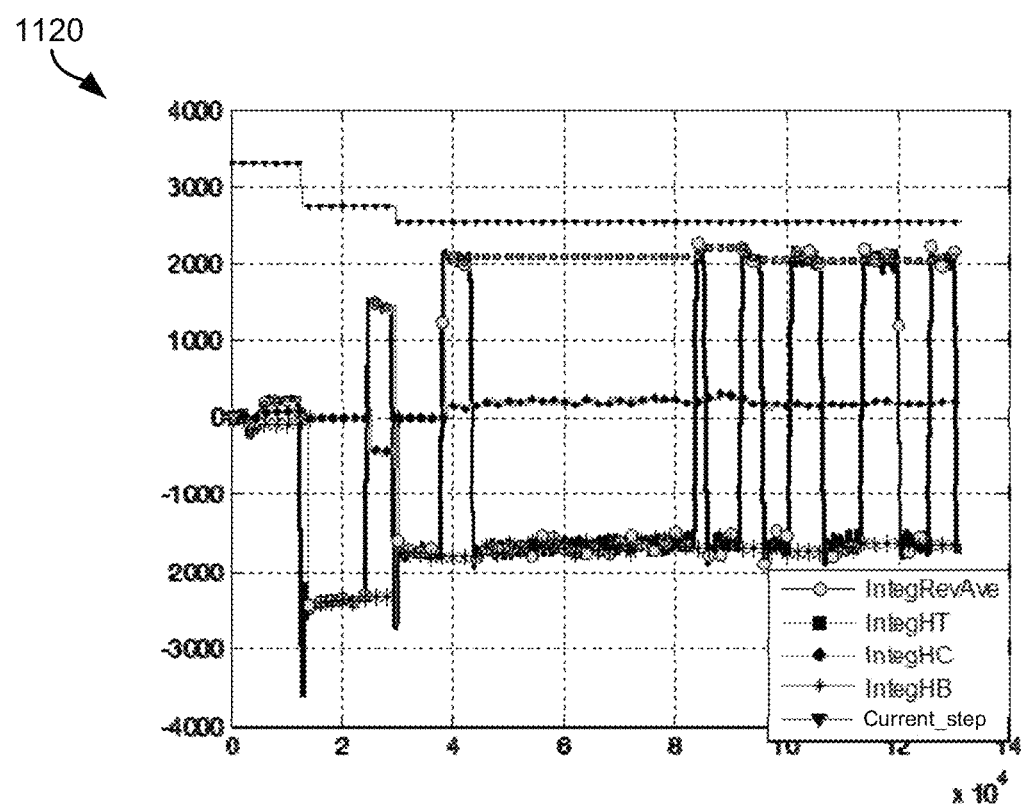

Referring now to FIGS. 11A-11C, the graphs 1100, 1110, 1120 depicted therein illustrate the exemplary effects achieved by implementing the process steps of methods 900 and 1000 on data corresponding to LTM phenomena for different tapes and/or cartridges. Specifically, the graphs 1100, 1110, 1120 of FIGS. 11A-11C illustrate the results that the inventors achieved by implementing the methods of FIGS. 9 and 10 on the different LTM phenomena illustrated in FIGS. 8A-8C respectively, and as described above.

Figure 8C:
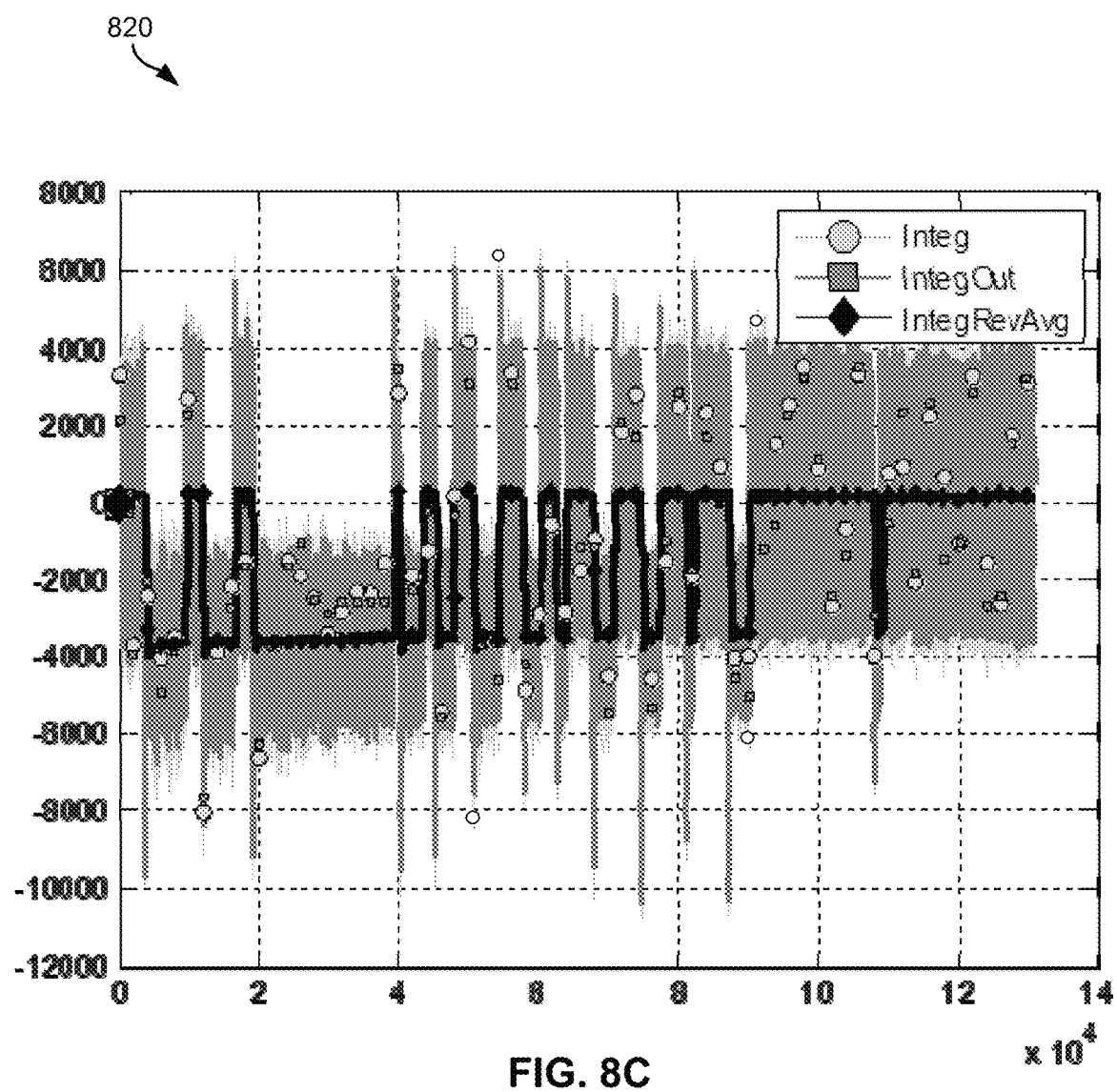

Similar to the graphs illustrated in FIGS. 8A-8C, the x-axis of the graphs 1100, 1110, 1120 in FIGS. 11A-11C represents a number of cycles corresponding to sampling intervals used to collect the data presented therein. In the examples shown, the sampling interval is 50 microseconds. Thus, the sampling intervals of graphs 1100, 1110, 1120 may be translated into units of time by multiplying by 50 microseconds (μsec). For example, the sampling interval $2\times10^4$, corresponds to $(50 \, \mu sec) \times (2\times10^4)=1.0$ second.

Looking to the graph 1100 of FIG. 11A, IntegRevAve remains at an approximately constant value between −1000 and −1500 on the x-axis. Thus, referring back to the method 900 of FIG. 9, decision 908 will repeatedly result in a NO because IntegRevAve will not be greater than zero. The method thereby proceeds to operation 912 to calculate IntegBot, rather than operation 910 to calculate IntegTop. As a result, decision 914 will also repeatedly result in a NO as IntegTop will not be calculated. It follows that IntegCtr will not be updated (e.g., changed) from its value of zero which is represented in the graph 1100.

Moreover, looking now to method 1000 of FIG. 10, decision 1004 will repeatedly result in a NO as the absolute value of IntegRevAve (which is between 1000 and 1500 for the present embodiment, as previously mentioned) is continually less than threshold1 which was set at 3000 for the present embodiment. Moving to decision 1014, the absolute value of IntegCtr (which decision 914 of method 900 determined would remain at zero) is continually less than threshold2 which was set at 500 for the present embodiment. As a result, the current position of the magnetic head Current_step is not incremented or decremented, and remains at about 550 as shown in graph 1100.

Referring now to graph 1110 of FIG. 11B, the Current_step is fixed for portions of the graph for which the IntegRevAve value is about constant between 1000 and 2000 on the x-axis. However, Current_step is decremented corresponding to the downward spikes seen in the graph 1110. Looking to the method 1000 of FIG. 10, during the downward spikes, IntegRevAve reaches almost −3500, thereby resulting in the absolute value of IntegRevAve being less than threshold1 and causing method 1000 to proceed to decision 1006 from decision 1004. Moreover, decision 1006 results in a NO thereby moving to operation 1008 where Current_step is decremented by one step as seen in graph 1110.

Both of the exemplary embodiments depicted in FIGS. 11A and 11B deal with a signal corresponding to a phenomenon in which tape primarily remains laterally shifted from a magnetic head in one direction, e.g., resulting from a flange shift as described above. Although the embodiment of FIG. 11B includes short downward stack shifts, for the phenomenon shown in both FIGS. 11A and 11B, the position of the coarse actuator is preferably updated once per revolution of the supply reel.

However, moving to FIG. 11C, if an embodiment includes a signal corresponding to a phenomenon in which the tape is laterally shifted from a magnetic head in a mixture of both directions, the position of the coarse actuator is preferably updated more frequently than once per revolution of the supply reel. For example, as described above, if a tape supply reel has 24 portions corresponding to each full revolution thereof, the position of the coarse actuator may be updated for each of the 24 portions of the full revolution of the supply reel.

Looking to graph 1120 of FIG. 11C, the data plotted thereon is consistent with a phenomenon in which the tape alternates between being laterally shifted to one side of the magnetic head and being laterally shifted to the opposite side of the magnetic head. Following the data points representing the current location of the coarse actuator Current_step, there are two main locations at which Current_step is decremented.

Looking to the first location, Current_step is decremented by two steps from about 3300 to about 2800 along the y-axis of graph 1120. This decrement corresponds to the sharp downward spike of IntegRevAve reaching below −3000. As described above with reference to FIG. 11B, the downward spike of IntegRevAve below −3000 causes decision 1006 of method 1000 to result in a NO thereby moving to the method 1000 to operation 1008 where Current_step is decremented by one step. This process is then repeated to result in the second decremented step of Current_step.

Furthermore, looking to the second location, Current_step is decremented by one step from about 2800 to about 2550 along the y-axis of graph 1120. This decrement corresponds to the sharp downward spike of IntegRevAve reaching almost −3000. Moreover, this downward spike of IntegRevAve causes IntegCtr to drop from zero to less than −500.

Referring back to decision 1004 of FIG. 10, because the absolute value of IntegRevAve is not greater than the first threshold value threshold1, which was set at 3000 for the present tested embodiment, the flowchart of method 1000 moves to decision 1014. Here it is determined that the absolute value of IntegCtr is greater than the second threshold threshold2, which was set at 500 for the present tested embodiment. Thus, decision 1014 results in a YES, whereby the flowchart proceeds to eventually increment Current_step in operation 1026 resulting from method 1000 determining that decision 1022 is not satisfied, producing a NO.

As a result, IntegCtr was incremented, causing the absolute value of IntegCtr to become smaller than threshold2. Moreover, the overall IntegRevAve was better centered towards zero on the y-axis, thereby corresponding to a lowered overall offset of the tape relative to the magnetic head of the present embodiment.

Thus the various embodiments described herein present a coarse servo algorithm which is able to better position the coarse actuator for a variety of phenomena for different tapes and/or cartridges, e.g., to improve reading and/or writing performed by an exemplary head on the different tapes and/or cartridges, depending on the desired embodiment.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

According to an exemplary embodiment, which is in no way intended to limit the invention, a computer program product may include a computer readable storage medium having program code embodied therewith. Moreover, the program code may be readable/executable by a controller (e.g., see 128 of FIG. 1A) to perform one or more of the operations of method 900 and/or 1000 illustrated in FIGS. 9 and 10 respectively.

Furthermore, in other embodiments, a computer program product may include a computer readable storage medium having program instructions stored/encoded thereon. Moreover, the program instructions may be executable by a controller to cause the controller to perform one or more of the operations of method 900 and/or 1000 illustrated in FIGS. 9 and 10 respectively.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for positioning an actuator, the computer program product comprising a computer readable storage medium having program instructions embodied therewith, wherein the computer readable storage medium is not a transitory signal per se, the program instructions executable by a processing circuit to cause the processing circuit to perform a method comprising:
    generating or receiving, by the processing circuit, a first value representative of a lateral position of a tape;
    using, by the processing circuit, the first value to adjust a position of a coarse actuator for moving a magnetic head in response to determining that the first value is in a first range relative to a first threshold; and
    using, by the processing circuit, an integrator value to adjust the position of the coarse actuator in response to determining that the first value is in a second range relative to the first threshold.

2. The computer program product as recited in claim 1, wherein the integrator value is calculated using the first value.

3. The computer program product as recited in claim 1, wherein the first value is updated after each revolution of a supply reel.

4. The computer program product as recited in claim 1, wherein using the integrator value to adjust the position of the coarse actuator comprises calculating a target step based on the integrator value.

5. The computer program product as recited in claim 1, wherein the integrator value is calculated using the first value and a second value, the value corresponding to the tape being positioned toward a first flange of a supply reel, the second value being previously stored and corresponding to the tape being positioned toward a second flange of the supply reel opposite the first flange.

6. The computer program product as recited in claim 1, comprising program instructions executable by the processing circuit to cause the processing circuit to compare the integrator value to a second threshold, and determine whether or not to adjust the position of the coarse actuator based on the comparing of the integrator value to a second threshold.

7. The computer program product as recited in claim 1, wherein adjusting the position of the coarse actuator moves a magnetic head relative to a tape.

8. An apparatus, comprising:
    a magnetic head;
    the computer readable storage medium of claim 1;
    a processing circuit for executing the program instructions stored on the computer readable storage medium; and
    a drive mechanism for passing a magnetic data storage medium over the magnetic head.

* * * * *